United States Patent [19]
Bechtolsheim et al.

[11] Patent Number: 5,764,935
[45] Date of Patent: Jun. 9, 1998

[54] HIGH SPEED ACTIVE BUS

[75] Inventors: Andreas Bechtolsheim, Stanford; Timothy Bucher, Newark; Edmund Kelly, San Jose, all of Calif.

[73] Assignee: Sun Microsystems, Inc., Mountain View, Calif.

[21] Appl. No.: 345,004

[22] Filed: Nov. 23, 1994

Related U.S. Application Data

[63] Continuation of Ser. No. 930,475, Aug. 13, 1992, abandoned, which is a continuation of Ser. No. 461,165, Jan. 5, 1990, abandoned.

[51] Int. Cl.⁶ ............................ G06F 13/40; G06F 13/362
[52] U.S. Cl. .................................................. 395/325
[58] Field of Search ........................ 364/DIG. 1, DIG. 2; 395/200, 325, 550, 700, 650, 725

[56] References Cited

U.S. PATENT DOCUMENTS

| | | | |
|---|---|---|---|
| 4,392,200 | 7/1983 | Arulpragasam et al. | 364/200 |
| 4,521,871 | 6/1985 | Galdun et al. | 364/900 |
| 4,535,448 | 8/1985 | Baxter et al. | 370/85 |
| 4,553,204 | 11/1985 | Hashimoto | 395/750 |
| 4,620,278 | 10/1986 | Ellsworth et al. | 364/200 |
| 4,626,985 | 12/1986 | Briggs | 364/200 |
| 4,630,193 | 12/1986 | Kris | 364/200 |
| 4,658,350 | 4/1987 | Eggerbrecht et al. | 364/200 |
| 4,697,858 | 10/1987 | Balakrishnan | 439/61 |
| 4,716,523 | 12/1987 | Burrus, Jr. et al. | 364/200 |
| 4,724,520 | 2/1988 | Athanas et al. | 364/200 |
| 4,766,536 | 8/1988 | Wilson, Jr. et al. | 364/200 |
| 4,799,146 | 1/1989 | Chauvel | 364/200 |
| 4,918,645 | 4/1990 | Lagoy, Jr. | 395/425 |
| 4,920,539 | 4/1990 | Albonesi | 371/40.2 |
| 4,928,246 | 5/1990 | Crawley et al. | 364/514 |
| 4,933,845 | 6/1990 | Hayes | 364/200 |
| 4,933,846 | 6/1990 | Humphrey et al. | 395/325 |
| 4,965,717 | 10/1990 | Cutts, Jr. et al. | 364/200 |
| 4,987,529 | 1/1991 | Craft et al. | 364/200 |
| 4,991,079 | 2/1991 | Dann | 364/200 |
| 5,003,195 | 3/1991 | Stelling et al. | 307/268 |
| 5,005,172 | 4/1991 | Kawamoto | 371/18 |
| 5,113,514 | 5/1992 | Albonesi et al. | 395/425 |
| 5,134,706 | 7/1992 | Cushing et al. | 395/725 |
| 5,148,545 | 9/1992 | Herbst et al. | 395/725 |
| 5,155,853 | 10/1992 | Mitsuhira et al. | 395/725 |
| 5,155,856 | 10/1992 | Bock et al. | 395/800 |
| 5,168,558 | 12/1992 | Matusch et al. | 395/425 |
| 5,179,670 | 1/1993 | Farmwald et al. | 395/325 |
| 5,220,673 | 6/1993 | Dalrymple et al. | 395/775 |
| 5,261,057 | 11/1993 | Coyle et al. | 395/275 |
| 5,428,794 | 6/1995 | Williams | 395/725 |

FOREIGN PATENT DOCUMENTS

A-0 165 600  6/1985  European Pat. Off. ........ G06F 13/36

*Primary Examiner*—Paul V. Kulik
*Assistant Examiner*—Maria N. Von Buhr
*Attorney, Agent, or Firm*—Blakely Sokoloff, Taylor & Zafman

[57] ABSTRACT

A high speed bus structure which makes the bus effective and practical to use for both single processor and multiple processor environments. This is achieved by providing an active bus wherein a number of logic functions which control the operation of the bus are removed from the modules and are centralized and incorporated into the bus. The amount of bus functionality provided by the modules is minimized therefore decreasing the complexity and computational overhead of the modules and traffic on the bus that are attributable to supporting the functionality to operate the bus. The number of bussed signal lines is minimized by eliminating the bussed lines relevant to the centralized bus functions. In place of the bussed signal lines, dedicated signal lines connect the modules inserted into the bus and the bus components providing the centralized logic functions. Thus certain states or commands which were separate commands are now incorporated into one of the basic bus commands or communicated through dedicated signal lines which connect the centralized bus components and the modules. Furthermore, certain signal lines not considered to be directly related to system performance are eliminated and incorporated into a bus transaction.

19 Claims, 16 Drawing Sheets

FIG. 2

| | PHYSICAL SIGNALS | | | |
|---|---|---|---|---|
| SIGNAL NAME | SIGNAL DESCRIPTION | OUTPUT | INPUT | LINE TYPE |
| CLK | Mbus Clock | clock buffer | Master/Slave/Arbiter | dedicated |
| MAD[63:0] | Address/Control/Data | Master/Slave | Master/Slave | bussed |
| MAS* | Address Strobe | Master | Slave | bussed |
| MRDY* | Data ready indicator | Slave | Master | bussed |
| MRTY* | Xaction retry indicator | Slave | Master | bussed |
| MERR* | Error indicator | Slave | Master | bussed |
| MBR* | Bus Request | Master | Arbiter | dedicated |
| MBG* | Bus grant | Arbiter | Master | dedicated |
| MBB* | Bus busy indicator | Master | Arbiter/Master | bussed |
| IRL[3:0] | Interrupt Level | Interrupt Log | Module (CPU) | dedicated |
| ID[3:0] | Module Identifier | System | Module | dedicated |
| AERR* | Asynchronous Error out | Module | Interrupt Log | bussed |
| RSTOUT* | Module reset out signal | Module | Reset logic | dedicated |
| RSTIN* | Module reset in signal | Reset logic | Master | dedicated |
| MSH* | Shared(level 2) | Bus watcher | Master | bussed |
| MIH* | Inhibit (level 2) | Bus watcher | Master Memory | bussed |

| SIGNAL NAME | PHYSICAL SIGNALS | SIGNAL DESCRIPTION |
|---|---|---|
| | | MULTIPLEXED SIGNALS (VALID DURING ADDRESS PHASE) |
| PA[35:0] | MAD[35:0] | PHYSICAL ADDRESS FOR CURRENT TRANSACTION |
| TYPE[3:0] | MAD[39:36] | TRANSACTION TYPE |
| SIZE[2:0] | MAD[42:40] | TRANSACTION DATA SIZE |
| C | MAD[43] | DATA CACHEABLE |
| LOCK | MAD[44] | BUS LOCK INDICATOR |
| MBL | MAD[45] | BOOT MODE/LOCAL BUS INDICATOR |
| VA[19:12] | MAD[53:46] | VIRTUAL ADDRESS (Optional) (LEVEL 2) |
| RESERVED | MAD[58:54] | RESERVED FOR FUTURE EXPANSION |
| SUP | MAD[59] | SUPERVISOR ACCESS INDICATOR (ADVISORY)(OPTIONAL) |
| MID[3:0] | MAD[63:60] | MODULE IDENTIFIER |

FIG. 4

| TYPE[3] | TYPE[2] | TYPE[1] | TYPE[0] | TRANSACTION TYPE |
|---|---|---|---|---|
| H | H | H | H | RESERVED |
| H | H | H | L | RESERVED |
| H | H | L | H | RESERVED |
| H | L | L | L | RESERVED |
| H | L | H | H | RESERVED |
| H | L | L | L | RESERVED |
| H | H | H | H | RESERVED |
| L | H | H | L | RESERVED |
| L | L | L | H | RESERVED |
| L | L | H | L | COHERENT READ AND INVALIDATE |
| L | L | H | H | COHERENT WRITE AND INVALIDATE |
| L | L | L | L | COHERENT READ |
| L | L | L | H | COHERENT INVALIDATE |
| L | L | L | L | READ |
| L | L | L | L | WRITE |

FIG. 5

| SIZE[2] | SIZE[1] | SIZE[0] | TRANSACTION SIZE |
|---------|---------|---------|------------------|
| L | L | L | BYTE |
| L | L | H | HALFWORD (2 BYTES) |
| L | H | L | WORD (4 BYTES) |
| L | H | H | DOUBLEWORD (8 BYTES) |
| H | L | L | 16-BYTE BURST |
| H | L | H | 32-BYTE BURST |
| H | H | L | 64-BYTE BURST |
| H | H | H | 128-BYTE BURST |

FIG. 6

| MERR* | MRDY* | MRTY* | MEANING |
|-------|-------|-------|---------|
| H | H | H | IDLE CYCLE |
| H | H | L | RELINQUISH AND RETRY |
| H | L | H | VALID DATA TRANSFER |
| H | L | L | RESERVED |
| L | H | H | ERROR1 => BUS ERROR |
| L | H | L | ERROR2 => TIMEOUT |
| L | L | H | ERROR3 => UNCORRECTABLE |
| L | L | L | RETRY |

FIG. 7

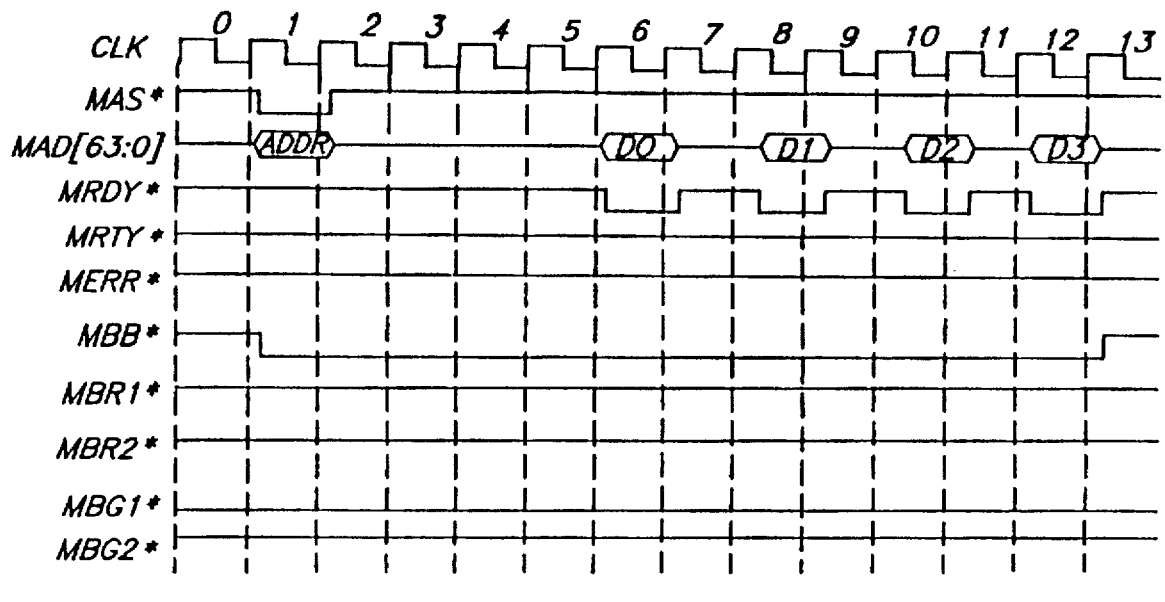
BURST READ WITH DELAYS  FIG. 8C
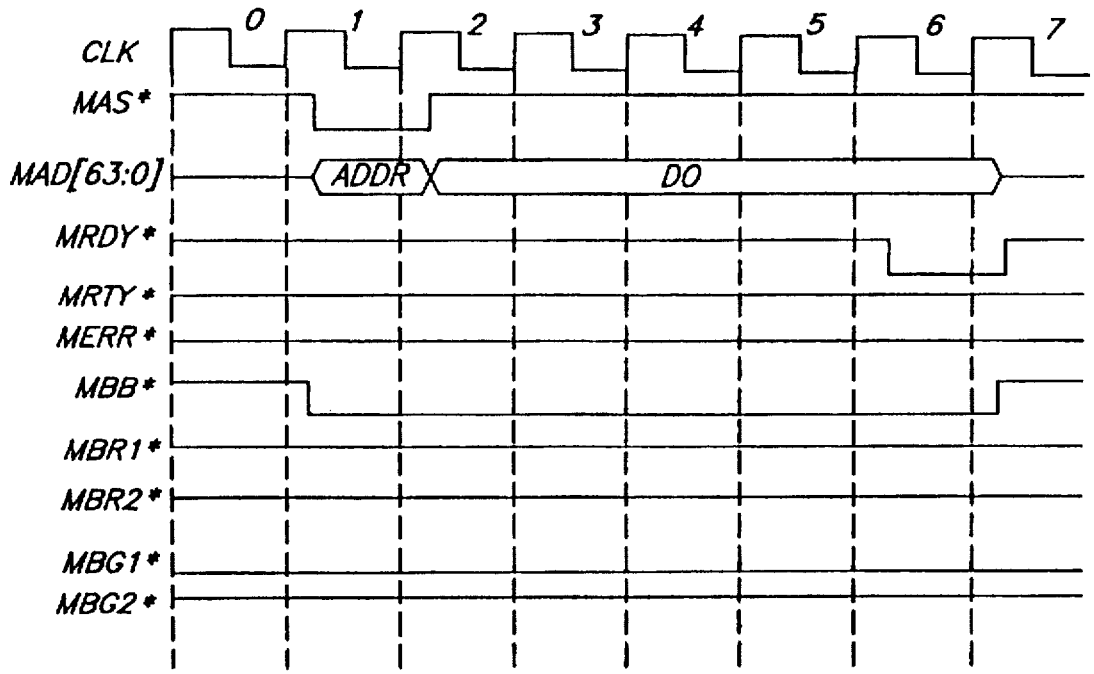
WORD WRITE  FIG. 9A

BURST WRITE WITH NO DELAYS

BURST WRITE WITH DELAYS

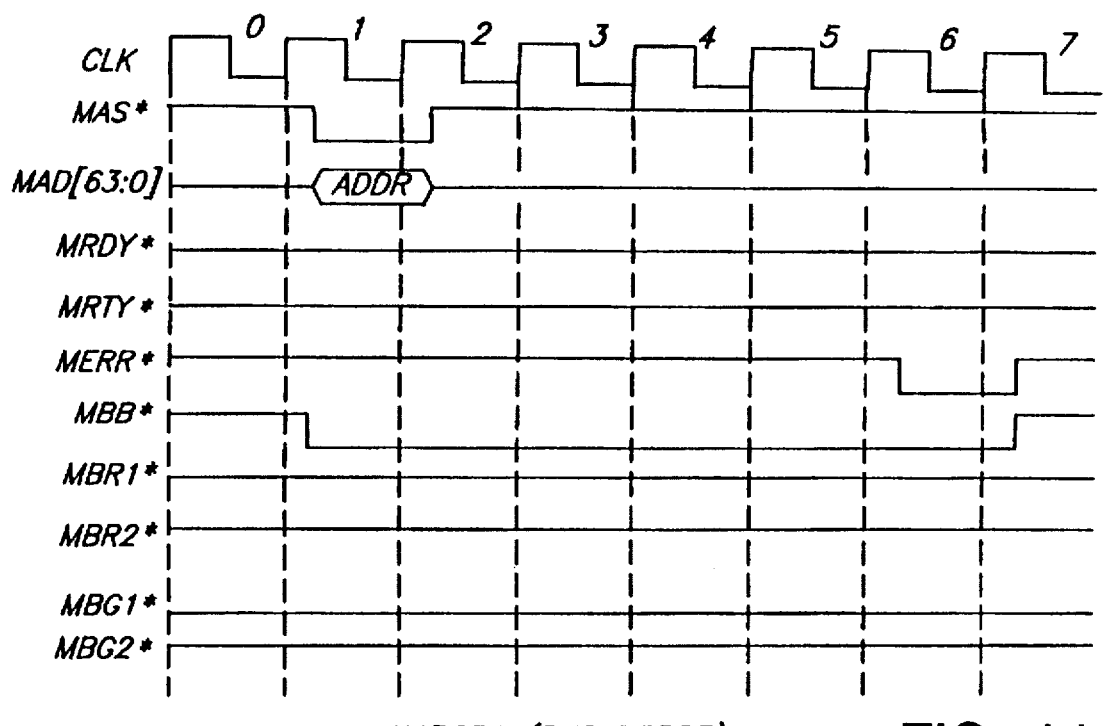
ERROR1 (BUS ERROR)     FIG. 11A
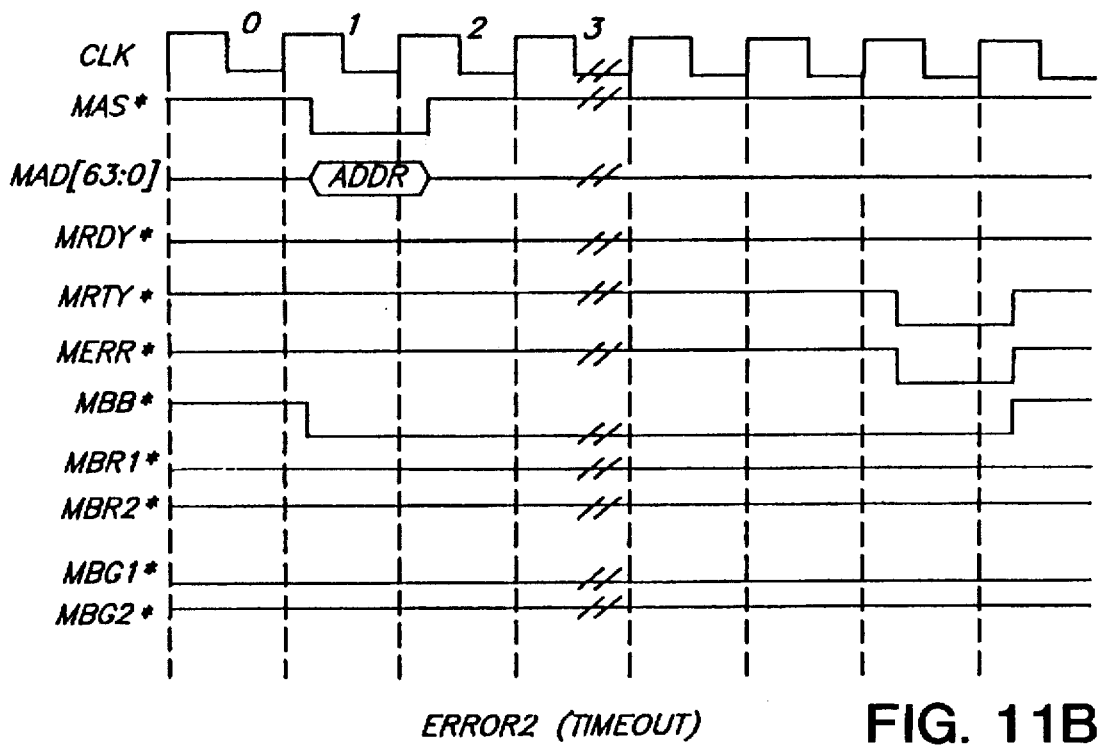
ERROR2 (TIMEOUT)     FIG. 11B

ERROR3 (UNCORRECTABLE)

ARBITRATION FROM MASTER 1 TO MASTER 2

COHERENT READ OF SHARED DATA

COHERENT READ OF OWNED DATA (LONG-LATENCY MEMORY)

COHERENT READ OF OWNED DATA (FAST MEMORY)

COHERENT READ AND INVALIDATE (OF SHARED DATA)

COHERENT READ AND INVALIDATE (OF OWNED DATA)

COHERENT WRITE AND INVALIDATE

HIGH SPEED ACTIVE BUS

BACKGROUND OF THE INVENTION

This is a continuation of application Ser. No. 07/930,475 filed Aug. 13, 1992, which is a continuation of application Ser. No. 07/461,165 filed Jan. 5, 1990, both now abandoned.

A bus is a group of signal lines over which information is transferred from any of several sources to any of several destinations. A bus is typically a passive device which is part of a backplane and is used to electrically connect a plurality of modules or circuit boards that are inserted into or attached to the backplane. A bus is referred to as a passive device because the logic or intelligence required to operate the bus is not part of the bus. Instead the active logic which provides the intelligence to make the bus function is contained in the modules which are inserted into the backplane. Because the active logic is located in the modules which plug into the bus and the specific modules to be inserted into a particular bus are generally unknown, many modules will contain duplicate circuits to support the bus operation functions. Depending upon the modules inserted into the bus, the circuits on all but one of the modules will be disabled because only one circuit is required to control the operation of the bus function. In another type of bus, the logic functions required to control the operation of the bus are distributed among a plurality of modules which are "daisy-chained" together, each module providing a portion of the functionality. An example of such a bus is referred to as the Future Bus, IEEE Specification Number 896.1, 1987.

In order to increase the speed of a system, the speed of the bus as well as the speed of the modules must be increased. Thus, as the processing speed of the modules which plug into the bus increase, so does the need for increasing the speed of the bus. It follows that one problem evident in present busses is the speed of information transferred in the bus and the speed at which a bus transaction is performed.

A problem seen in present busses is the number of signal lines required to accommodate different types of signals and signal conditions. This adds to the complexity and therefore the cost of the bus as well and also adds to the complexity and costs of the modules which plug into the bus. Thus, while some busses attempt to provide for most signal conditions which may occur by providing separate signal lines for each condition, other busses simply do not provide for these signal conditions.

An example of this problem arises with respect to error coding. An error can occur on the bus for a variety of reasons such as inaccessible input/output devices, inaccessible memory or system failure. Many busses provide a single error code which indicates that an error has occurred. No further information is provided. In response to this error code, the processor halts its present processing and attempts to determine the cause of the error. If the system has crashed or failed, the processor has already halted and therefore the cause of the bus error is indeterminable.

SUMMARY OF THE INVENTION

It is therefore an object of the invention to provide a high speed bus that is practical to use in both a single processor and multiple processor environment.

It is an object of a present invention to provide a bus structure that is cost effective, easy to implement and is system efficient.

It is further an object of the present invention to provide a bus structure which provides for the determination and indication of bus errors which occur such that additional processor time is not required to determine the source of the error and actions may be taken in response to the error.

A high speed bus structure is provided which makes the bus effective and practical to use for both single processor and multiple processor environments. This is achieved by providing an active bus wherein a number of logic functions which control the operation of the bus are removed from the modules and are centralized and incorporated into the bus. The amount of bus functionality provided by the modules is minimized therefore decreasing the complexity and computational overhead of the modules and traffic on the bus that are attributable to supporting the functionality to operate the bus.

The number of bussed signal lines is minimized by multiplexing and by eliminating the bussed lines relevant to the centralized bus functions. In place of the bussed signal lines, dedicated signal lines connect the modules inserted into the bus and the bus components providing the centralized logic functions. Thus certain states or commands which were separate commands are now incorporated into one of the basic bus commands or communicated through dedicated signal lines which connect the centralized bus components and the modules. Furthermore, certain signal lines not considered to be directly related to system performance are eliminated and incorporated into a bus transaction.

A bus protocol is provided wherein the address and data information of the command are multiplexed on to the bus from the transmitting or master module to the receiving or slave module. During the transmission of the first plurality of signals multiplexed, referred to as the address phase, the physical address of the device and transaction specific information are transmitted. One or more subsequent signal transmissions, referred to as the data phase, transfer the data relative to the information transmitted during the address phase.

In addition, the present invention ameliorates the decrease in bus speed caused by a single device controlling the bus for an extended period of time and preventing other devices from having access to the bus for this extended period of time. Furthermore, the bus structure provides for the encoding of bus errors, thereby providing detailed error codes and minimizing the amount of processor overhead required to determine and respond to error signals.

BRIEF DESCRIPTION OF THE DRAWINGS

The objects, features and advantages of the present invention will be apparent from the following detailed description of the invention in which:

FIG. 2 illustrates the physical signals employed in the bus of the present invention.

FIG. 3c shows an exemplary holding amplifier utilized in the preferred embodiment of the present invention.

FIG. 4 illustrates the transaction specific bus information used during the address phase in the bus of the present invention.

FIG. 5 illustrates the transaction type encoding employed in the bus of the present invention.

FIG. 6 illustrates the transaction size encoding employed in the bus of the present invention.

FIG. 7 illustrates the transaction status encoding used in the bus of the present invention.

FIGS. 8a, 8b and 8c are timing diagrams which illustrate the read operations.

FIGS. 9a, 9b and 9c are timing diagrams which illustrate the write operations.

FIGS. 11a, 11b and 11c are timing diagrams which illustrate the implementation of error codes as acknowledgement of a bus operation.

DETAILED DESCRIPTION OF THE INVENTION

Figure 1:
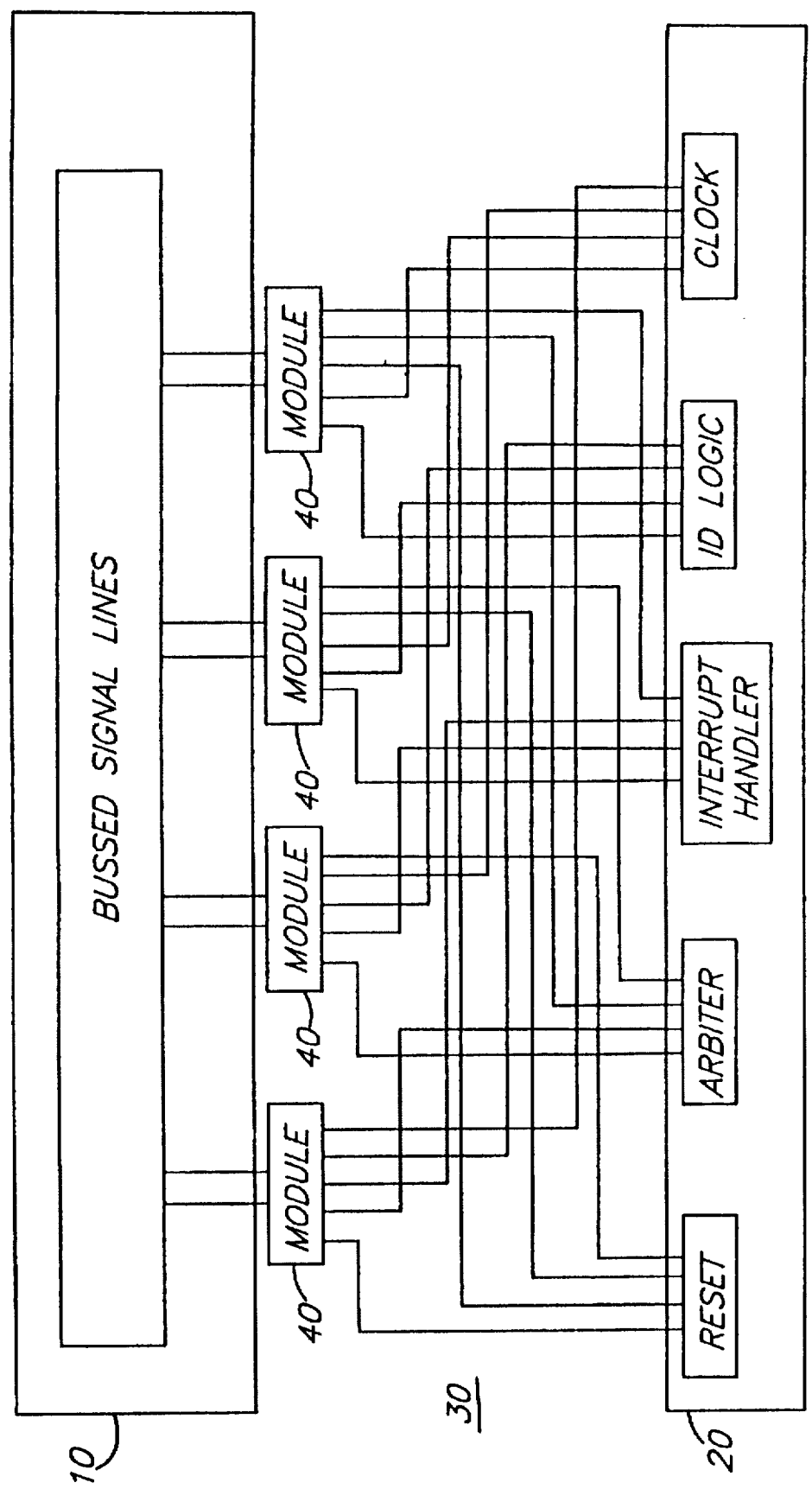
FIG. 1 is a block diagram illustration of the bus of the present invention.

An active bus is provided in which the logic required to provide and control various bus functions are removed from the modules which are attached to the bus. These bus functions are incorporated into the bus as centralized components accessible by the modules. This is illustrated in FIG. 1. The bus structure of the present invention comprises bussed signal lines 10, centralized components 20, and dedicated signal lines 30. The bussed signal lines 10 related to those functions are eliminated and connections between the centralized components 20 and the modules 40 are made through dedicated signal lines 30. Furthermore, the number of different bus transactions which occur on the bussed signal lines is minimized. As a result, the bus structure and bus operation are simplified and the speed of the bus is increased for operation in both the single processor and multiple processor environment.

In the following description for purposes of explanation, specific memory sizes, bit arrangements, numbers, data transfer rates, etc. are set forth in order to provide a thorough understanding of the present invention. It will be apparent to one skilled in the art, however, that the present invention may be practiced without these specific details. In other instances, well known circuits and components are shown in the block diagram form in order not to obscure the present invention unnecessarily.

The preferred embodiment of the bus is designed to be used with CMOS technology. As such, certain power specifications and timing protocols are optimized to reduce power consumption and work efficiently with CMOS devices. It will be apparent to those skilled in the art that those specifications may be changed without departing from the spirit of the present invention.

Throughout the following description, certain bus lines will be described as being "active high" or "active low." This terminology is used to indicate whether a particular bus signal in question is, or is not, asserted and relevant to the bus operation. It will be apparent, however, that it is a matter of design choice whether a given bus line is active high or active low. While the preferred embodiment has been designed to maximize data transfer speed and minimize power consumption, it will be appreciated that changing the design of the bus to change an active high line to active low is within the scope of the present invention.

Similarly, as is illustrated below, the preferred embodiment of the bus is completely synchronous. All bus signals change on the rising edge of the clock pulses. The synchronous design is desirable because high data transfer rates require high clock speeds, and it is easier to detect clock pulse edges at high speeds. It will be appreciated that the use of the rising edge of the clock pulses is a matter of design choice and that the present invention could be made completely synchronous with the falling edges of the clock pulses.

Added flexibility is provided to the bus and the modules which plug into the bus because the logic originally inserted into each of the modules is eliminated from the modules and a single centralized unit on the bus is provided which contains the logic necessary to supply the functionality. Therefore, the modules do not limit how certain functions are implemented and the implementation of such functions may be changed without affecting the modules. The centralized components which perform and control certain functions may be easily changed simply by modifying the logic of the centralized component which is part of the bus.

The functions which are incorporated as centralized functions on the bus are preferably those functions which are not easily implemented in a distributed manner among the modules which are attached to the bus. Most preferably these functions include, but are not limited to, arbitration, interrupt handling, system reset and the system clock.

By providing centralized functions as centralized components incorporated into the bus and connecting the centralized components to the modules via dedicated lines, the bus complexity and overhead are decreased. The centralized components are invisible to the bussed signal lines because they are separately handled through dedicated signal lines. Thus the overhead, and therefore decrease in bus speed, is decreased enabling the bus to work at high speeds regardless of the complexity added to the bus due to a multiple processor environment.

Referring to FIG. 2, the signals employed in the bus of the present invention are described. FIG. 2 depicts the bus signals used in the preferred embodiment which may be used with a 32 bit processor. As is illustrated by FIG. 2, the number of bussed signal lines required for the bus is minimized. Bussed signals are limited to a 64 bit wide address/control/data signal line, address strobe signal line, data read signal line, retry signal line, error indicator signal line, and asynchronous error out signal line. The signal lines, bus request lines, bus grant lines, interrupt level signal lines and module identifier signal lines have been removed from the bussed signal lines and are dedicated lines between each module and a corresponding centralized function. For example, the bus grant and bus request signal lines are dedicated signal lines between each module and the arbiter which is now a centralized function in a component which is part of the bus. The interrupt level signal lines are dedicated signal lines between each module and the centralized component which handles interrupts.

The ID signal lines are dedicated lines which connect the centralized component which determines module ID's to each module. The module ID's may be distributed by the centralized component according to the module's location on the bus. Alternatively, the module ID may be hardwired to the ID signal lines; the module ID determined according to the module's location on the bus.

Each bus transaction consists of two phases. The address/control/data lines contain different information during each phase. During the first phase, referred to as the address phase, the address and transaction specific information is transmitted on the bus and during the second phase, referred to as the data phase, the data is transmitted. During the address phase, a portion of the 64 bit wide address/control/data signal lines is used to transmit an address from the master module (the module sending out the request) to the slave module (the receiver of the request) the remaining unused bits consist of transaction specific signals and status bits for the transaction. Preferably, during the address phase, a 36 bit address is transmitted from the master module to the slave module and the remaining 28 bits of the address/control/data signal lines consist of transaction specific signals and status bits for the transaction.

The transaction specific bits provide specific information regarding the bus transaction which, in prior art devices, may be reflected as a separate bus signal lines. Through the bus of the present invention, there exists a core set of bus transactions which may encompass a broad variety of situations and transactions on the bus through the use of the transaction specific bits that are transmitted during the address phase.

In many prior art buses, the signal lines which make up the bus are digital lines which can be driven to either a high level (1) or a low level (0). These signal lines may be asserted by being driven active low by a module. When the line is to be deasserted, the module ceases driving the line low and pull-up resistors return the line to its normally high state. The speed which the line is returned to its inactive (high) state is a function of the capacitance of the line and the value of the pull-up resistance. Whenever a tri-statable signal is asserted, the module containing the driver for that signal first pulls the signal low (asserted). After asserting the signal, the driver will drive the signal high (inactive) before tri-stating (i.e. turning itself off). The signals lines are connected to passive pull-up resistors which bring the signals to the inactive levels within a short time period. Because of the low power DC specifications of CMOS devices it is not possible to provide active pull-up resistors which change the signals from the active to inactive levels within a short time period.

Figure 3A:
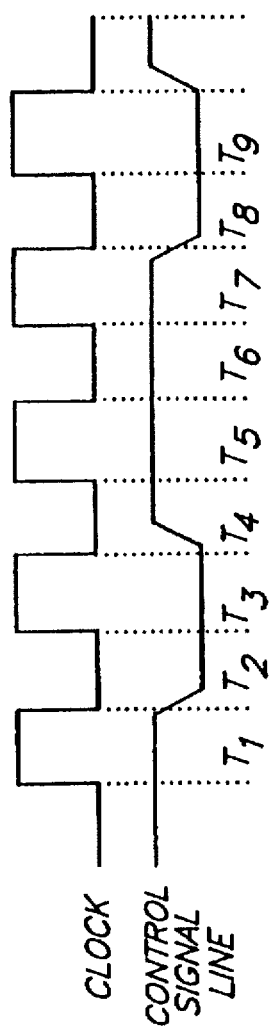
FIGS. 3a, 3b and 3c are timing diagrams which illustrate the electrical protocols associated with the signal lines employed in the preferred embodiment of the present invention

The bus of the present invention is not limited to a particular protocol for asserting and deasserting signal lines. However, in the preferred embodiment, a combination of pull-up resistors and holding amplifiers are connected to the signal lines as biasing means to maintain the signal line during those times the signal line is not active, i.e., not driven by a driver. The pull-up resistors connected to the signals lines do not change the state of the signal from active to inactive. The resistors merely maintain the signal at its inactive level. The signal lines are driven both low and then high, thereby avoiding the problem of floating signals which is present in many prior art bus system. This is illustrated in the timing diagram of FIG. 3a which shows a signal line driven at different times by two different drivers. At time $T_1$, the signal line is in an inactive state and is held high by the pull-up resistor. At time $T_2$, the signal line is driven active low by a first driver. At time $T_4$, the signal line is driven active high by the first driver and at time $T_5$–$T_7$ the driver is no longer driving the signal line and the signal line is held high by the pull-up resistor. At time $T_8$, the signal line is driven active low by a second driver and at time $T_9$ the signal line is driven high by the second driver which then turns itself off leaving the signal line in a high state as maintained by the pull-up resistor. This protocol is described in co-pending U.S. patent application Ser. No. 07/387,227, filed Jul. 28, 1989, now U.S. Pat. No. 5,097,483, issued Mar. 17, 1992, which is a Divisional Application of U.S. patent application Ser. No. 07/313,250, filed Feb. 21, 1989, now U.S. Pat. No. 5,121,487, issued Jun. 9, 1992, assigned to the Assignee of the present invention and is herein incorporated by reference.

Figure 3B:
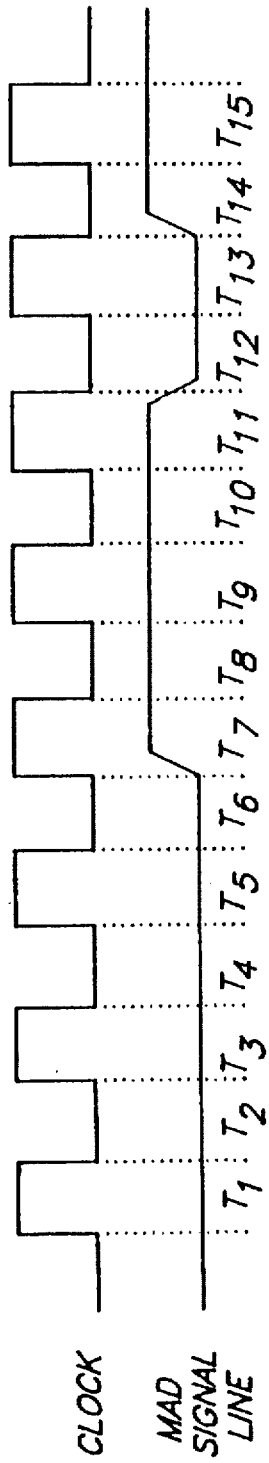
Figure 3C:
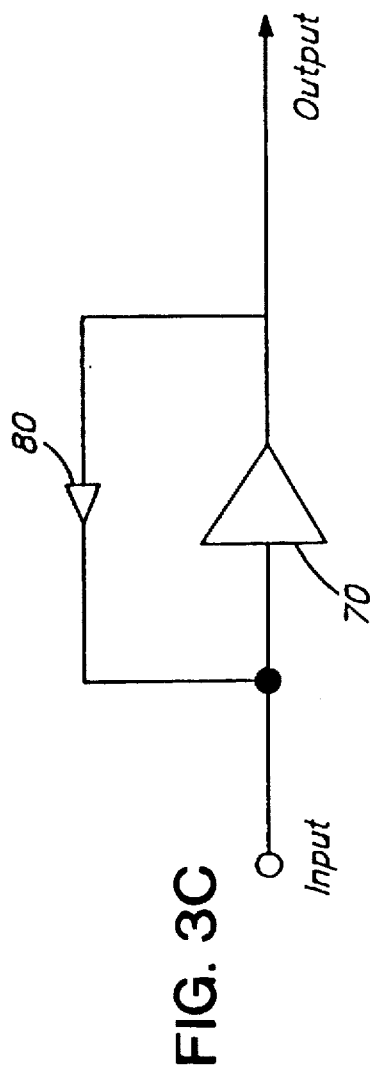
Figure 8A:
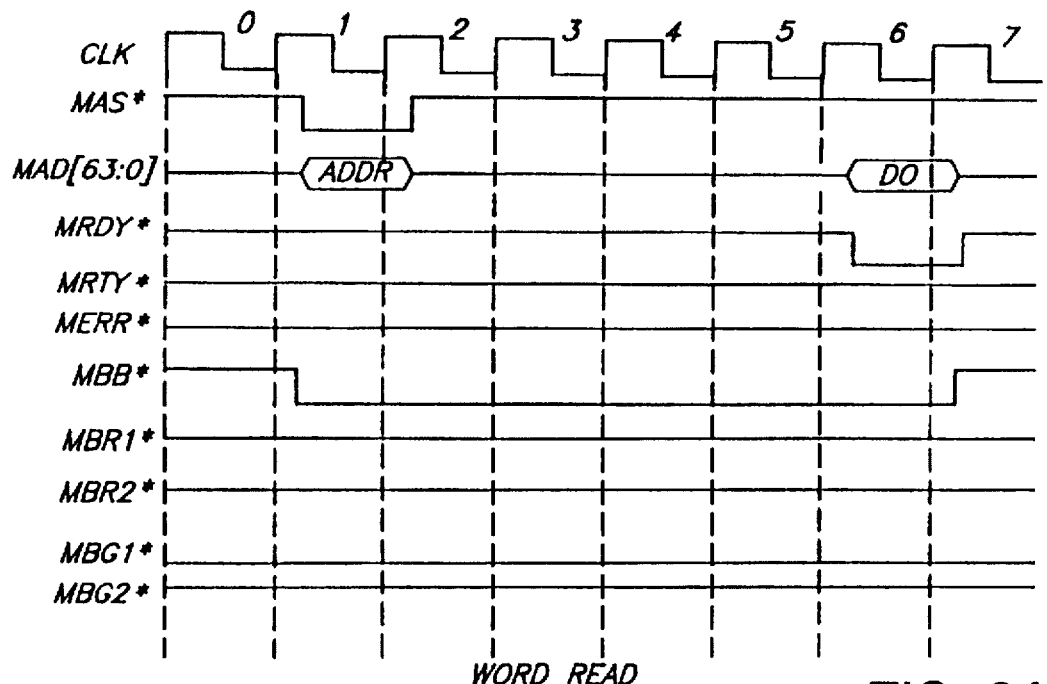
Figure 8B:
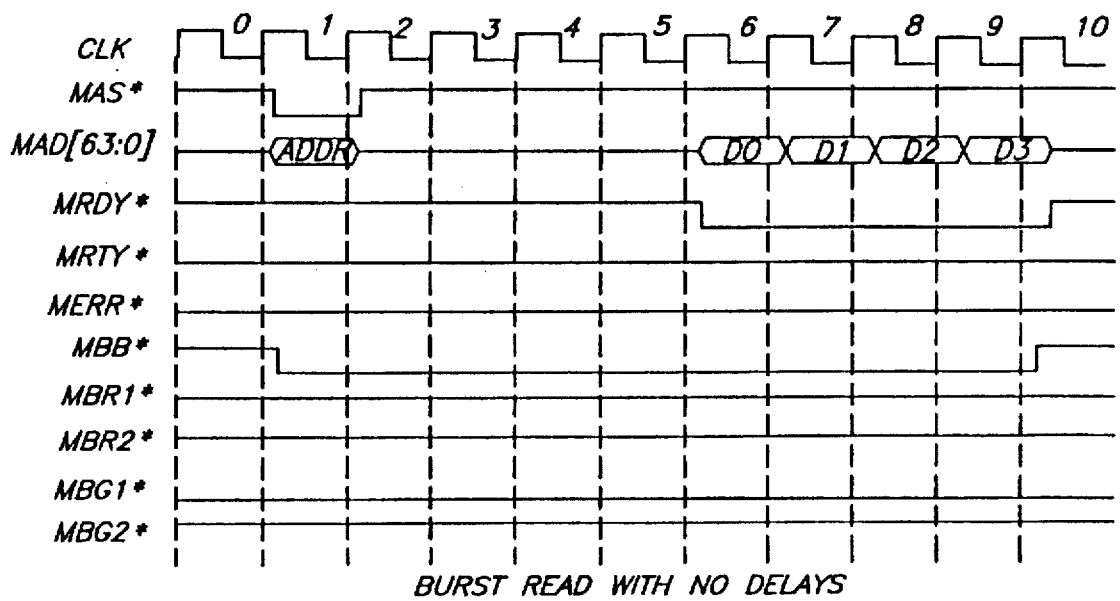
Figure 9B:
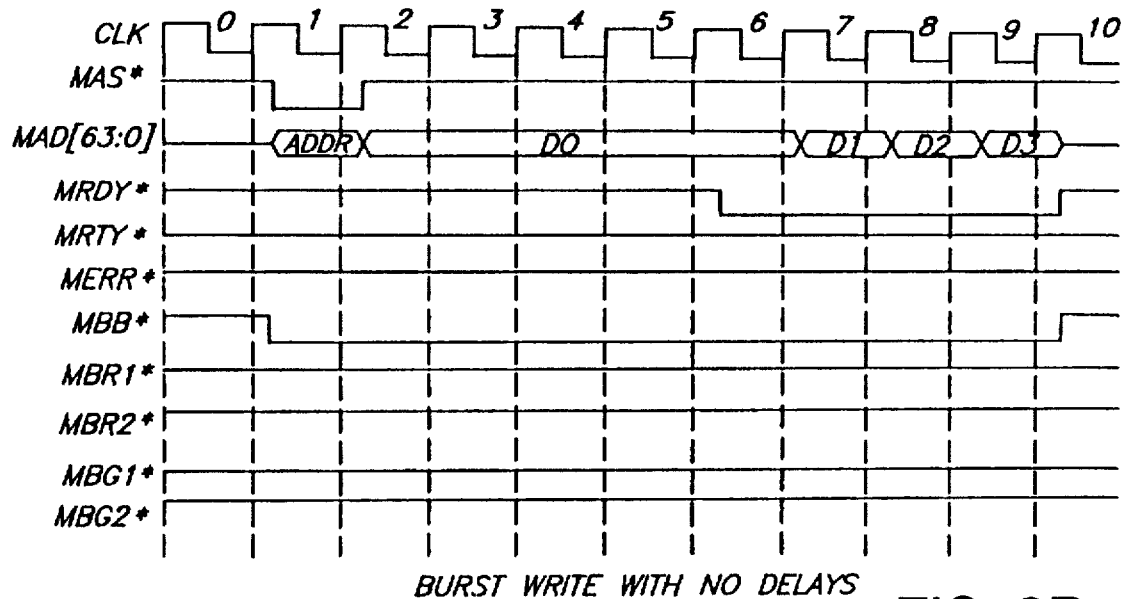
Figure 9C:
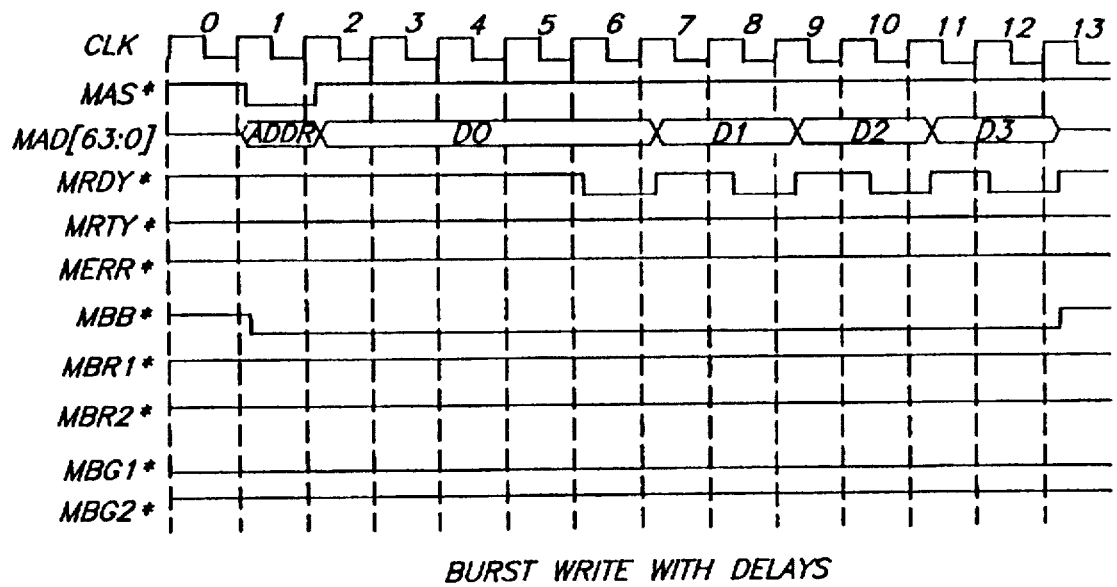

Alternatively, a holding amplifier is used in place of a pull-up resistor. The holding amplifier functions as a low driver amplifier that remembers the previous state of the line and tries to maintain that level with a high impedance. An exemplary holding amplifier is illustrated in FIG. 3c. The input signal is received by the input buffer 70 which amplifies the signal to drive the signal on the bus and the signal is also input to a weak amplifier 80 which has a high impedance and weak drive capacity. The weak amplifier causes the input to the input buffer 70 to be held to the last driven value until the input to the input buffer is driven to a different value by the input signal to the circuit. Similar to the pull up resistors, the weak amplifier of the holding amplifier is easily over-ridden by signal drivers (such as those in the modules) and does not affect signal timing or voltage levels. This is illustrated by the timing diagram of FIG. 3b. At time $T_1$, the signal line is held low by the holding amplifier. At time $T_2$, the signal line is driven low by the first driver. When the first driver becomes inactive, at time $T_4$, the holding amplifier holds the signal line in the low state. At time $T_7$, the second driver drives the signal line high and becomes inactive at time $T_8$, at which time the holding amplifier maintains the signal line in the high state. At time $T_{11}$, the signal line is driven low by the second driver and is maintained low at time $T_{12}$ by the holding amplifier. Similarly, at time $T_{14}$ the first driver becomes active and drives the signal line high and becomes inactive at time $T_{15}$ whereby the holding amplifier maintains the signal line in a high state.

Preferably the biasing means connected to each of the 64 address/control/data lines (MAD [63:0]) are holding amplifiers. This is preferred because unlike control signal lines, the information on MAD [63:0] does not need to be asserted and deasserted to convey the information. Rather, the information need only be present on the signal lines when control signals are asserted and deasserted which indicate that the information is present . Thus, it is desirable to use holding amplifiers because after signals are asserted on the MAD [63:0] lines, the holding amplifier maintains those signals in that state until another driver becomes active and drives the signal lines. Similarly, it is preferred that the MSH signal line is connected to a low impedance pull-up resistor because of its differing electrical characteristics provided because MSH can be simultaneously driven by multiple drivers. The remaining signal lines may use either a pull-up resistor or a holding amplifier as a biasing means depending upon the implementation used.

Referring to FIG. 4, the transaction specific information (also referred to herein as "multiplexed signals") is described. The first series of bits, that is bits 0 to 35, indicate the physical address of the component with respect to the current transaction which is multiplexed onto the bussed signal lines. The next series of bits, 39 to 36, identify the transaction type of the bus transaction. Presently, in the single processor environment, the two transactions available are read and write as shown in FIG. 5. Four additional transaction types are employed for the multiprocessor environment. These additional bus transactions, Coherent Read, Coherent Invalidate, Coherent Read and Invalidate, and Coherent Write and Invalidate, provide for multiple processor cache operations.

The next three transaction specific bits are referred to as the data size bits which indicate the transaction data size information. The size field is encoded as logarithm, base 2, of the number of data bytes transferred. For example, as illustrated in the chart of FIG. 6, the transactions size may be a byte, a half-word, a word, double word, or bursts of multiple bytes. It should be noted that for transactions having a data size greater than 8 bytes more than one bus ready (MRDY) signal will be needed. This is accomplished using a feature referred to as "wrapping". In this process, the first address transmitted during the address phase defines the first physical address of the data to be transferred. Data transferred on subsequent acknowledgments will be determined by incrementing address bits MAD [n:3] by a value of 1 where n=3 for a size of 16 bytes, n=4 for a size of 32 bytes, n=5 for a size of 64 bytes and n=6 for a size of 128 bytes. As the address is incremented, the MAD [n:3] field will wrap around without incrementing. MAD [35:n+1] remains unchanged for the entire transaction.

Status bit MAD [44], referred to as the cache transaction indicator, indicates the current bus transaction is cacheable in the system caches attached to the bussed signal lines. The lock indicator signal or status bit permits a component to lock the bus and perform a number of indivisible transactions. This may be used to lock a master module to a particular slave module.

The bus boot mode/local bus indicator (MBL) MAD [45], is an advisory bit asserted by processor modules during the address phase of boot mode transactions or during local bus transactions in order to provide an expanded address during boot, thereby providing access to additional memory.

The supervisor access indicator (SUP) MAD [59] is asserted by processor modules to indicate that the transaction requires privileged or supervisor access. This is typically used during error recovery to determine whether the error occurred during a user process or during a supervisor access. If the error occurred during a user process, the error may typically be isolated from a system-wide error by halting the user process. However, if the error occurs during supervisor access, the system may be halted.

During the data phase, the address/control/data lines are used to transmit the data relevant to the current bus transaction. The remaining physical signals perform the following functions: MAS is the memory address strobe signal line. A signal is asserted on this line by the master module during the first cycle of the bus transaction to indicate that the current cycle of the bus transaction is the address phase of the transaction. The MRDY, MRTY and MERR signal lines respectively represent the bus ready transaction status bit, the bus retry transaction status bit, and the bus error transaction status bit.

The MRDY, MRTY and MERR signal lines indicate a three bit status of the transaction currently on the bus providing up to a total of eight different statuses, and are typically asserted by the slave module in response to a transaction request by the master module. When MRDY is asserted by itself it indicates that valid data has been transferred. When the MRTY bit is asserted by itself, it indicates that the slave component wants the master component to abort the current transaction immediately and start over. When MERR is asserted by itself, it indicates that a bus error or other system implementation specific error has occurred.

It has been found that most errors occurring on the bus are due to a time out because a module is inaccessible, a bus error or an uncorrectable error which occurred in the system. Typically, if an error occurs, a bus will activate the error signal line indicating that an error occurred. However, a single error line does not relay any information to the component or device which has requested a transaction through the bus regarding the type of error which has occurred. If an error signal is received, the processor has to take time out from its normal processing duties to determine the cause of the error and perform an action in response to the error. The bus of the present invention provides a plurality of different error statuses using the transaction status bits on the bussed signal lines. Thus, the transaction status bits provide information relevant not only to errors but also valid bus transfers. By using the status bits error coding, the complexity and overhead of the system is decreased and while the sophistication of the error detection and correction algorithms are increased.

The transaction status and status bit organization of the preferred embodiment is illustrated in FIG. 7 which shows the organization sequence of MERR, MRDY and MRTY. When all three have values of one (i.e. inactive state) the bus cycle was idle; when MRTY is in a low state the transaction status reflects a relinquish and retry state; when MRDY is in a low state, a valid data transfer has occurred; and when MERR is low by itself or in combination with MRDY or MRTY a specific error has occurred such as bus error, time out or an uncorrectable system error.

Referring back to the physical signal summary of FIG. 2 the MBR physical signal line, bus request, is a dedicated line on which a signal is asserted by the master device on the bus to gain access to or ownership of the bus. MBG, bus grant, is a dedicated signal line on which a signal may be asserted by a centralized arbiter component, incorporated into the bus, when a particular master device is granted ownership of the bus. MBB, bus busy, is a bussed signal line on which a signal is asserted as an output during the entire bus transaction including locked cycles indicating that the bus is busy. A device wishing to access the bus samples this signal to determine when it can obtain the bus. As soon as the currently accessing device releases the bus and the MBB signal is reset, another device can access the bus. RSTIN is the reset input signal line. A signal is asserted on this line by a device to indicate that the system is to perform a reset action which initializes all devices residing on the bus to a predefined state. A signal is asserted on the dedicated RSTOUT line, reset output signal, to have the system perform some reset action which is system dependent. AERR, asynchronous error detect out signal, is a bus signal line on which a signal is asserted by a module to indicate that an asynchronous error was detected. The dedicated IRL lines, interrupt request level, are used by processor modules to transfer the interrupt request level to the centralized interrupt handler. The dedicated ID lines provide signals indicative of the module identifier of the component connected to the bus. During the address phase of a bus transaction, the code indicated by the ID lines is reproduced on the multiplexed address/data/control lines. This provides the means for uniquely identifying each module which is useful to distinguish processor modules in the multiple processor environment. In particular it provides the means to identify the source of a transaction which is important for the implementation of the relinquish and retry function.

In the bus of the present invention, the bus transactions in a single processor environment have been limited to two transaction types: read and write. In a read transaction, the master module, such as a processor, will read information from a slave module, such as memory, and in a write transaction the master module will write data to a slave module. The slave module in response to a request to read and write will acknowledge the request by enabling the proper signal lines, MERR, MRDY, MRTY which provides a three bit transaction status code. This is illustrated by the timing diagrams of FIGS. 8a–8c and 9a–9c which show the timing diagrams for word read and write transactions and read and write transactions in which the data is transmitted in bursts.

The first transaction status that may be asserted by the slave module is the idle state. The idle state occurs when there is no bus activity or when it is necessary to assert wait states in between the address cycle and the data cycle, or between consecutive data cycles.

Another transaction status which may be returned over the MERR, MRDY and MRTY signal lines is referred to as "relinquish and retry". A problem which frequently occurs on the bus is that a single slow module will monopolize the bus for an extended period of time. The problem worsens as the speed of the bus increases because the overall speed of the bus is decreased by a factor attributable to the amount of time modules have to wait to gain access to the bus.

Figure 10A:
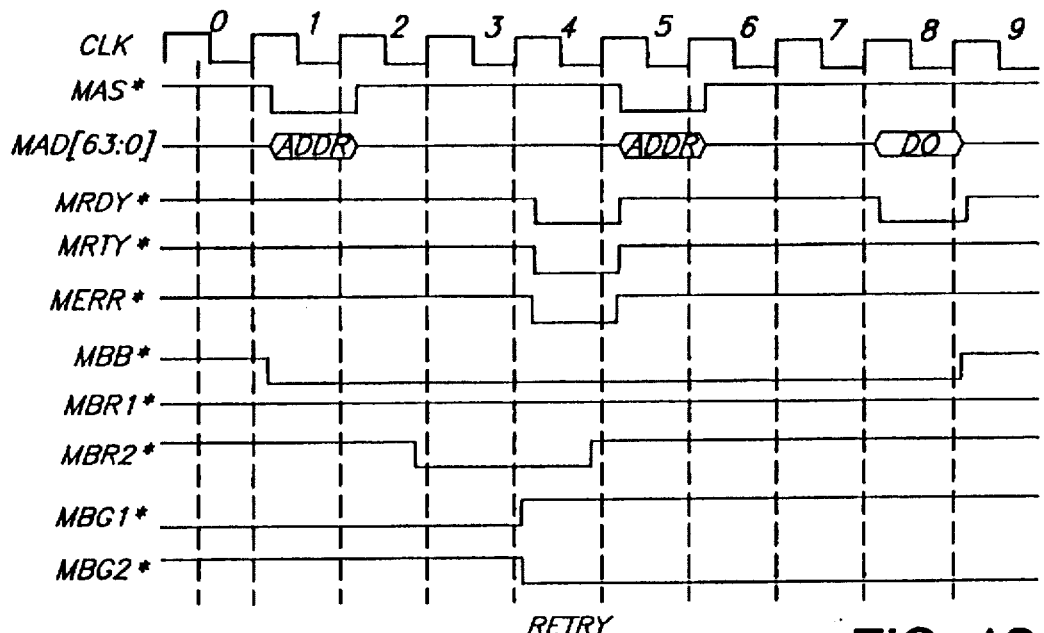
FIGS. 10a and 10b respectively are timing diagrams of the retry and relinquish and retry operations.

This problem was addressed using a "retry" function for a bus operating in a single processor environment by pending patent applications: Ser. No. 07/313,250 filed Feb. 21, 1989, now U.S. Pat. No. 5,121,487, issued Jun. 9, 1992; Ser. No. 07/387,599, filed Jul. 28, 1989, now U.S. Pat. No. 4,937,734, issued Jun. 26, 1990; and is illustrated by the timing diagram of FIG. 10a.

Figure 10B:
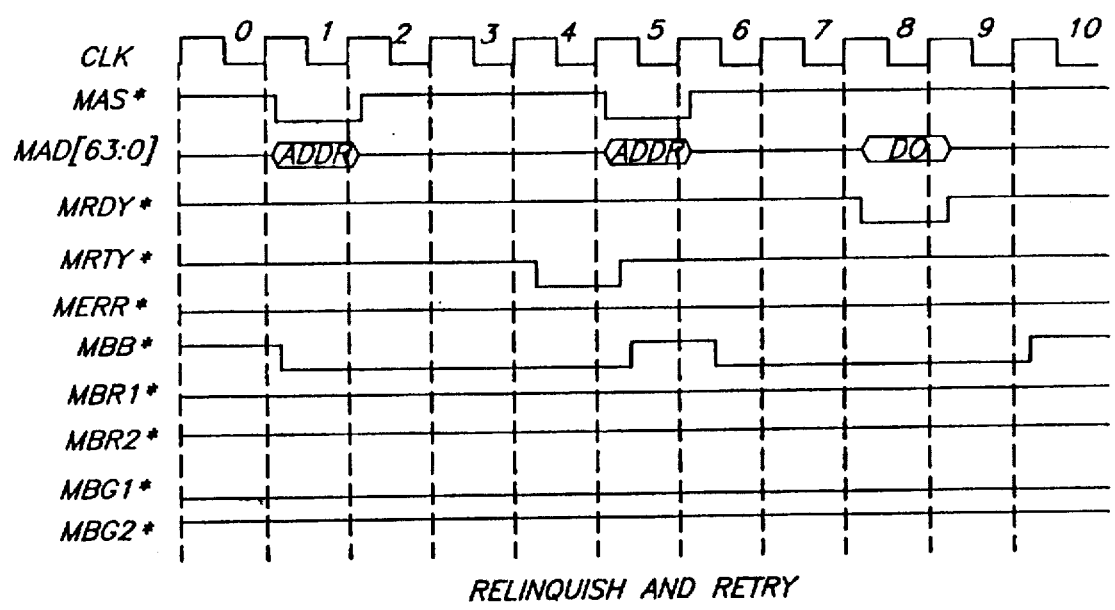

The relinquish and retry acknowledgement of the present invention provides the means to limit the amount of time a module will monopolize the bus. If a slave module receives a transaction request on the bus from a master module and it cannot receive or transmit data immediately, it will capture the ID of the master module and transmit a relinquish and retry acknowledgement to the master module by asserting the code for a single bus cycle. This signal indicates to the master module that the slave module is not ready, and rather than monopolize the bus while waiting for the slave module to be ready, it should release the bus immediately so that the bus can be rearbitrated and possibly used by another master module that is waiting to use the bus. When the master module releases the bus, the corresponding transaction is suspended. The suspended transaction must then wait until the master module again obtains ownership of the bus before the transaction can be completed. On a burst transaction, that is one which involves multiple transactions and multiple acknowledgements, typically used to transfer multiple contiguous blocks of data, a relinquish and retry acknowledgement can only be asserted on the first data transfer and cannot be asserted in the middle of the transfer of the multiple contiguous blocks of data. This is to prevent the break-up and retransmission of contiguous blocks of data. It is important in a multi-processor environment for the slave module which issues the relinquish and retry signal to capture the ID which is output through the multiplexed address/control/data lines of the master module whose transaction is being postponed in order to know which master module should receive acknowledgment when the slave module completes the transaction. If a master module with an ID other than that captured by the slave module should attempt to access the slave module while the module is busy, it should simply be given a relinquish and retry acknowledgment. The timing diagram for the relinquish and retry is illustrated in FIG. 10b.

Another acknowledgement sent by the slave module is the valid data transfer acknowledgement which indicates that valid data has arrived on a read cycle or the data has been accepted by the slave module and the writing master module should stop sending the data.

Still another status code asserted during the acknowledgement cycle is the retry which differs from the relinquish and retry in that the master module does not relinquish the bus but simply retries to access the slave module.

Figure 11C:
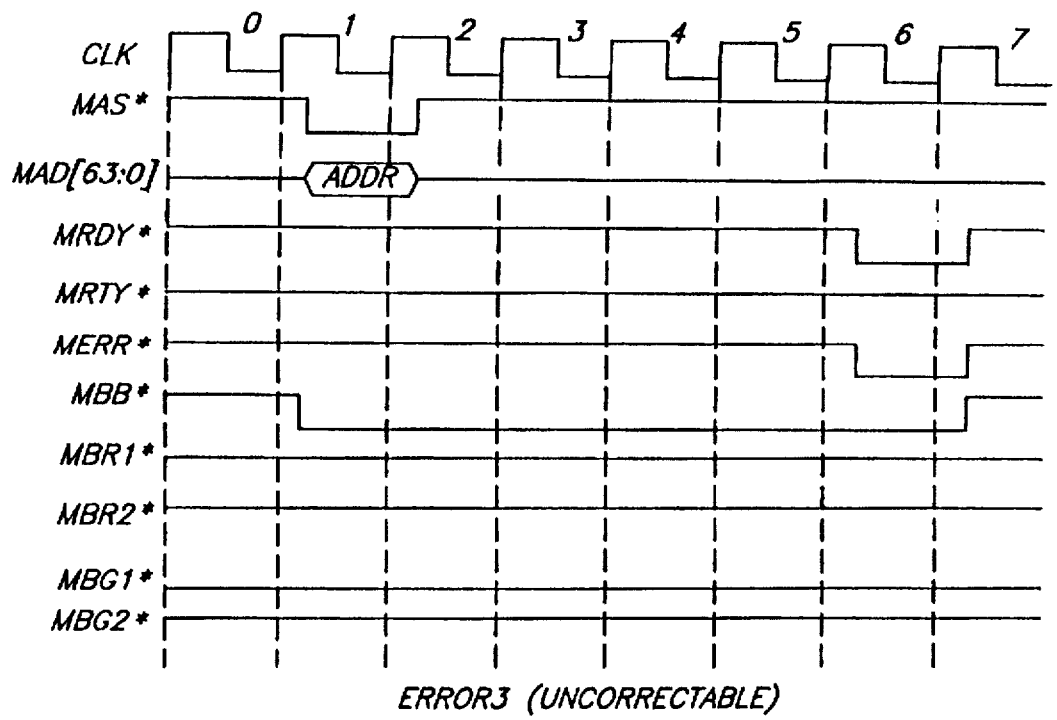

As discussed earlier, there are three error code acknowledgement signals which may be asserted. The first error code that may be asserted is a bus error, which typically indicates a size error but may also be used to indicate an error which is system implementation dependent. The second error code that may be asserted is the time out, typically generated after a predetermined number of cycles have lapsed without any acknowledgement. The third error code is an uncorrectable error code which is mainly used by the address memory controller to inform the requesting controller that during the process of accessing the data, some sort of uncorrectable error had been encountered (e.g. parity error). The implementation of the error codes is illustrated by the timing diagrams of FIGS. 11a–11c.

Figure 12A:
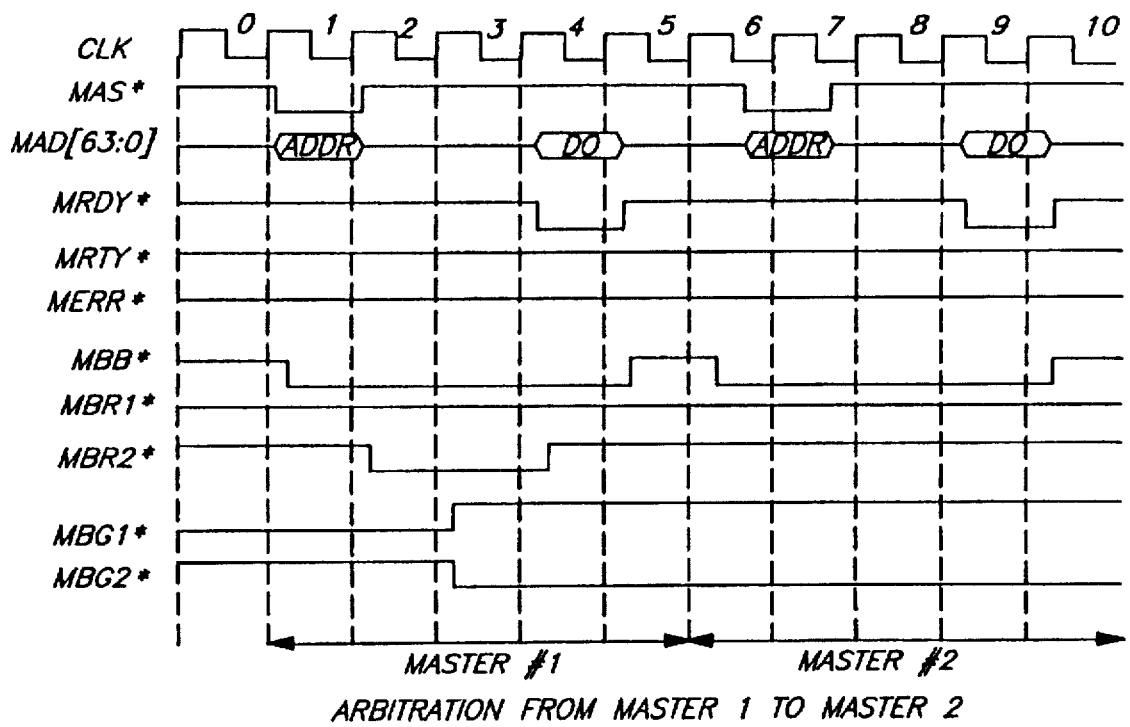
FIGS. 12a and 12b are timing diagrams which illustrate the use by the arbiter of the MBB bussed signal line and MBR and MBG dedicated signal lines.
Figure 12B:
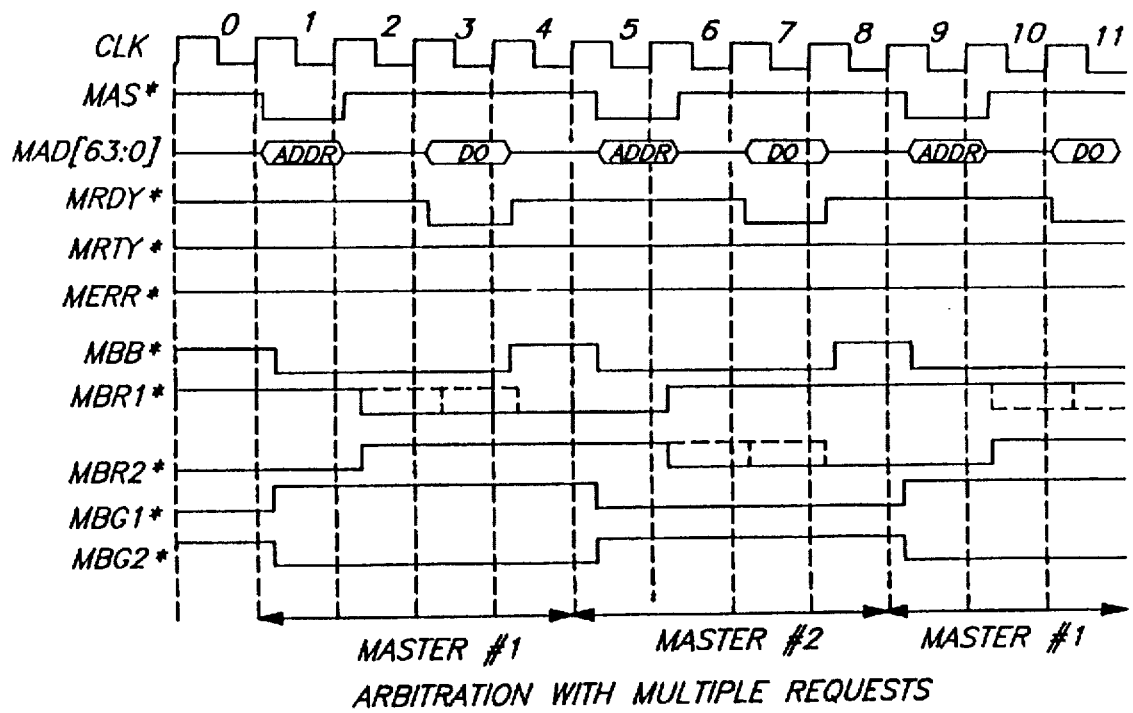

As discussed above, certain mechanisms or functions have been incorporated into the bus as components which provide centralized functions. These are correspondingly removed from the modules which connect to the bus. The corresponding bussed signal lines have been removed from the bused lines in order to simplify the physical structure of the bus, to decrease the amount of information transmitted over the bussed signal lines and therefore increase the speed of the bus. One mechanism removed from the modules is the bus arbitration mechanism (the arbiter). By making the arbiter a centralized component on the bus, the overhead of the modules and the amount of communication traffic over the bussed signal lines is decreased. Furthermore, the exact algorithm used by the arbiter is system implementation dependent, rather than module dependent, thereby providing added flexibility to the bus configuration because the bus is not limited to a specific implementation of an arbiter. The centralized arbiter uses the dedicated signal lines MBR, and MBG and bussed signal line MBB to communicate with the modules connected to the bus. This is illustrated by the timing diagrams of FIGS. 12a and 12b. For example, the master module will activate a MBB signal when the bus is busy. If the bus is not busy, it is granted to a module and the arbiter will cause the MBG signal to be set.

Another function removed from the modules is the interrupt handler. The interrupt handler uses dedicated signal lines, interrupt level signal line and asynchronous error out signal line to communicate with the modules connected to the bus. Similarly, it is preferred that the module ID function and the system clock function are implemented in centralized components on the bus and are connected to the modules via dedicated signal lines.

Additional signals of the bus structure provides for multiple processor systems and a cache consistency protocol to keep consistent multiple caches using the bus. Only the minimal physical signals and types of the bus transactions are used thereby maintaining the simplicity of the bus while providing the functionality required. The additional physical signals required with the second tier structure, as shown in FIG. 2, are the memory inhibit (MIH) and shared block indicator (MSH) signals line. The shared block signal line is used to inform all caches that a line is shared. Whenever a read block request appears on the bus, each processor module immediately searches its cache directory for the particular block of data. If a valid copy is found, the MSH signal is asserted during the second or subsequent cycle after the address cycle. This indicates to the caches that contain the line to update the status to reflect a shared state. A signal on the MIH signal line is asserted by the owner of a cache block during the second cycle after the address cycle to inform the main memory that the current bus block read request should be ignored. This is because the owner, not the memory, will be responsible for delivering the cache data block. If the MIH signal is not asserted, the main memory will be responsible for delivering the data.

The bus provides for the option of connecting virtual addressing caches to the bus. In addition to the transaction bits transmitted during the address phase of a transaction, as shown in FIG. 4, eight bits are provided for virtual addressing of virtually indexed caches. The bits are used to overcome the "virtual address aliasing" problem associated with large virtual caches by insuring the same index into the virtual directory as well as the snooping directory. The address bits ensure that direct mapped virtual caches are consistent regardless of aliasing. This is explained in copending patent application, Ser. No. 07/461,225, filed Jan. 5, 1990, entitled APPARATUS FOR MAINTAINING CONSISTENCY IN A MULTIPROCESSOR COMPUTER SYSTEM USING VIRTUAL CACHING, which is herein incorporated by reference.

In the multi-processor environment, the same transaction type signals as shown in FIG. 5 are used to define the operations in the multiple processor environment with respect to caches by setting the size equal to the block size. Read operations of cachable data, are enabled by issuing the coherent read operation. However, if no cachable data operations are involved the signal lines are not set. As illustrated in FIG. 5, the additional transaction types provided in the multi-processor environment are coherent read, coherent invalidate, coherent read and invalidate, and coherent write and invalidate.

Figure 13:
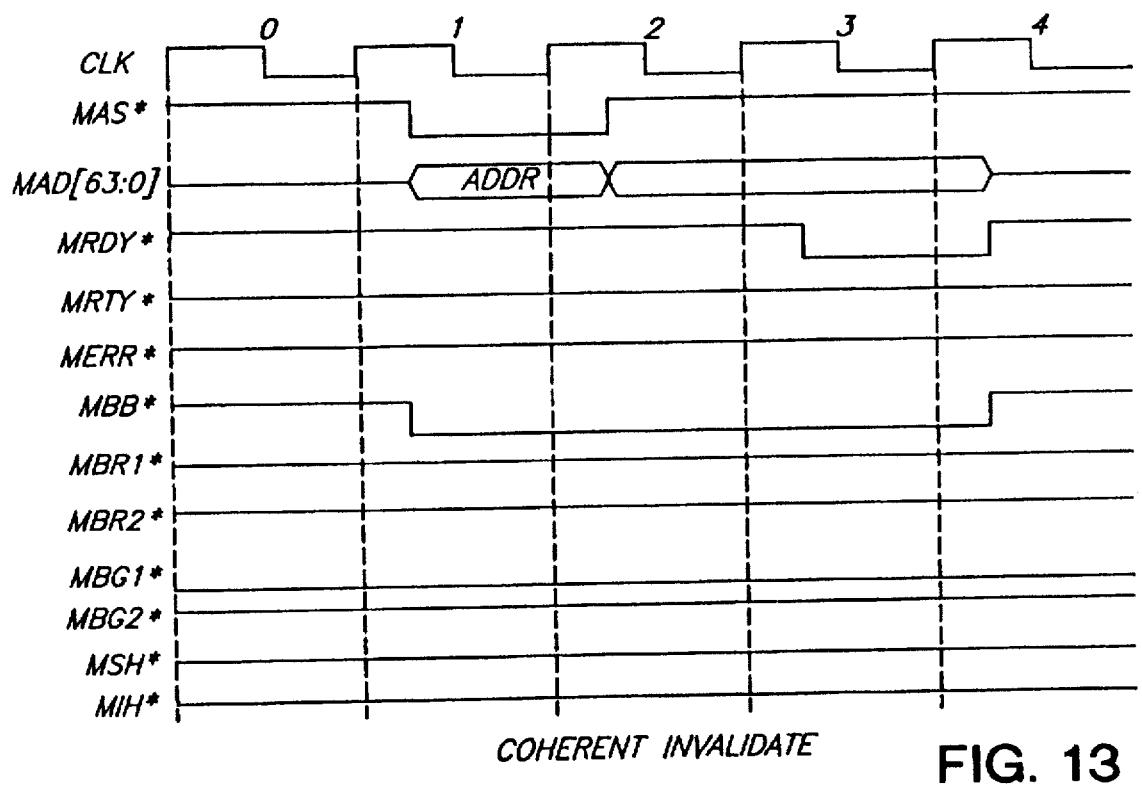
FIG. 13 is a timing diagram which illustrates the coherent invalidate operation.

The coherent invalidate operation, illustrated by the timing diagram of FIG. 13, is used when a cache is performing a write into shared data. Before the write can actually be performed, all other system caches must have their local copies invalidated by the coherent invalidate transaction.

The coherent read operation is a block read transaction that maintains cache consistency. The participants in the transaction are the requesting cache, the other caches which snoop and memory. There are three situations which caches that snoop can experience:

a) For a snooping cache which does not have a copy of the requested block, it simply ignores this transaction;

b) For a snooping cache which does have a copy of the requested block but does not own it, it simply asserts a signal on the MSH line;

c) For a snooping cache which owns the requested block, it will assert signals on both the MSH and MIH signals lines and will subsequently transmit the requested data.

Figure 14A:
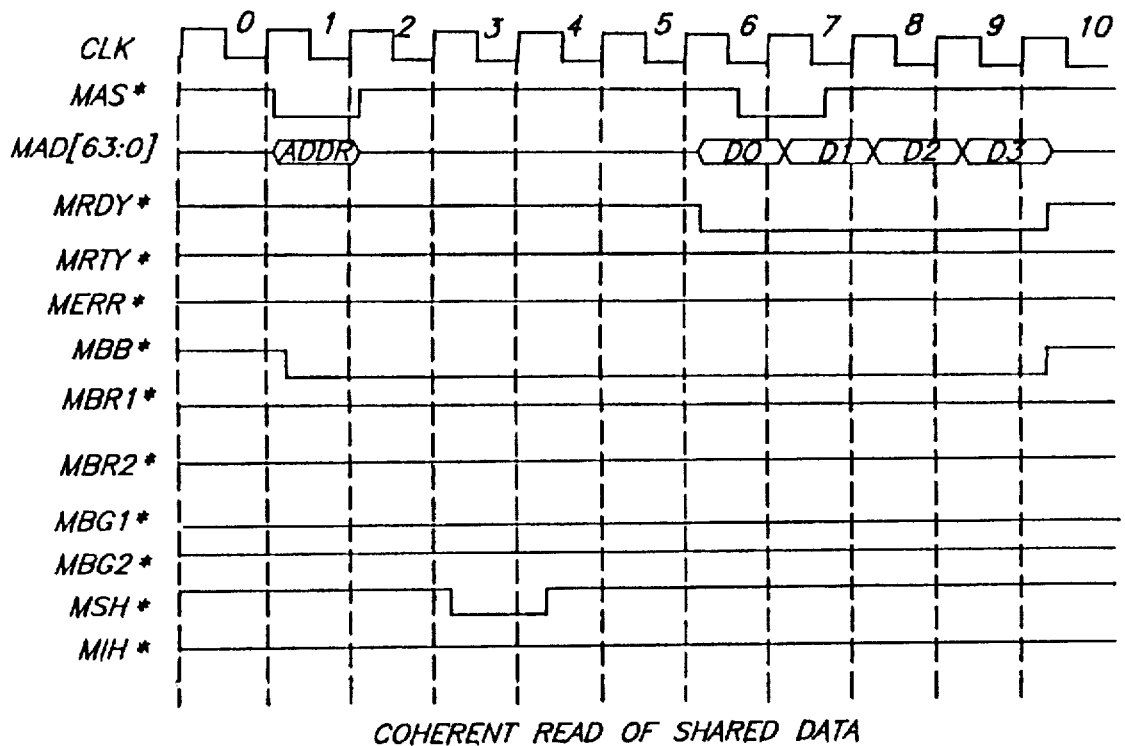
FIGS. 14a, 14b and 14c are timing diagrams which respectively illustrate the coherent read operation of shared data, the coherent read of owned data from long-latency memory and the coherent read of owned data from fast memory.
Figure 14B:
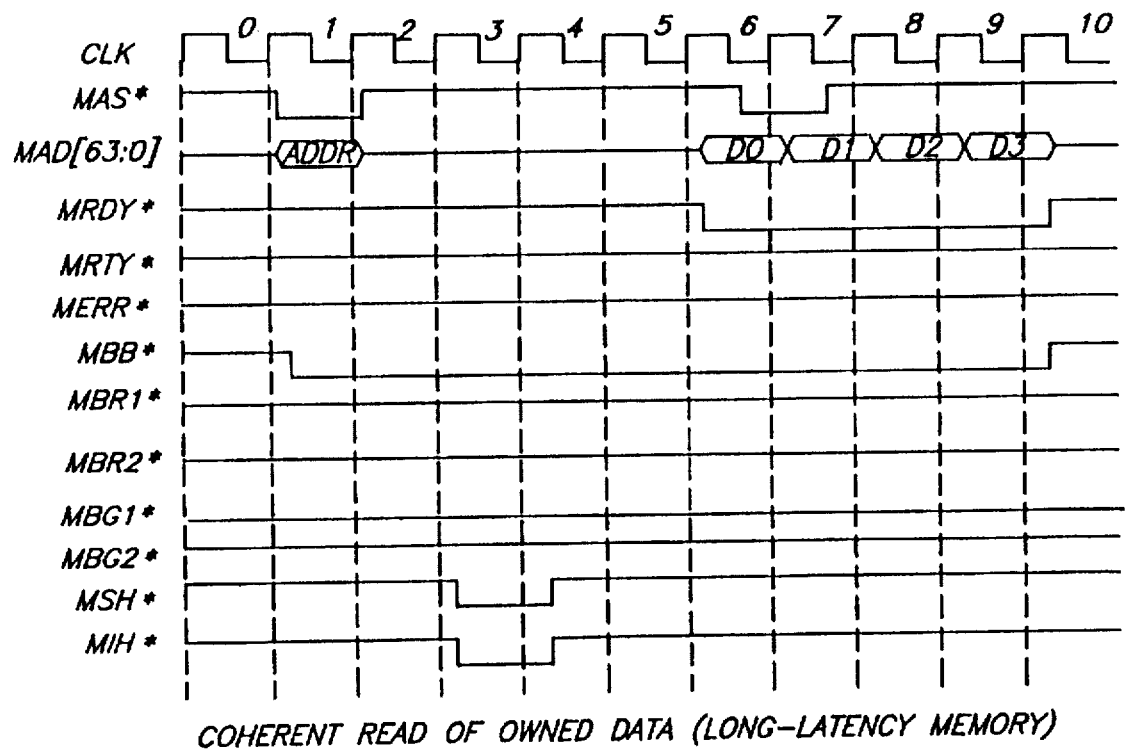
Figure 14C:
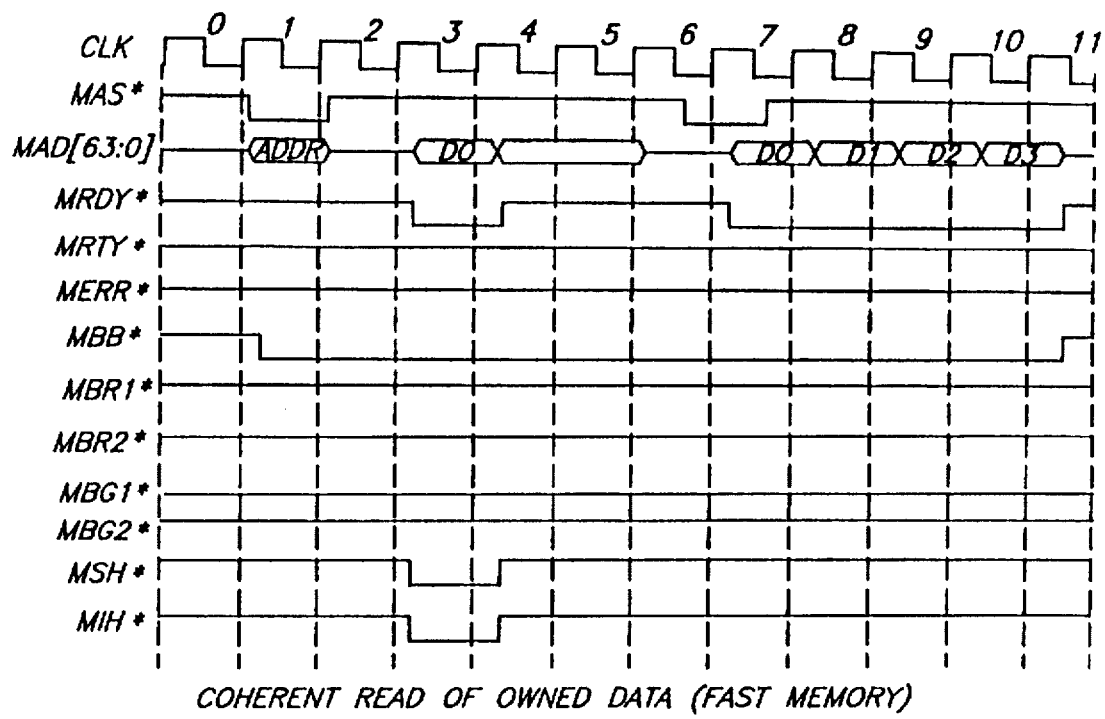

As discussed above, the MIH signal is only asserted by a snooping cache which owns the requested block. This signal affects three parties, the snooping cache, the memory and the requesting cache. The signal tells the requesting cache that it may have received stale data from memory and to ignore that data and wait for correct data. The signal tells memory to stop sending data immediately. Timing diagrams for the coherent read operation of shared data, coherent read operation of owned data from long-latency memory and the coherent read of owned data from fast memory are respectively illustrated in FIGS. 14a–14c.

Figure 15A:
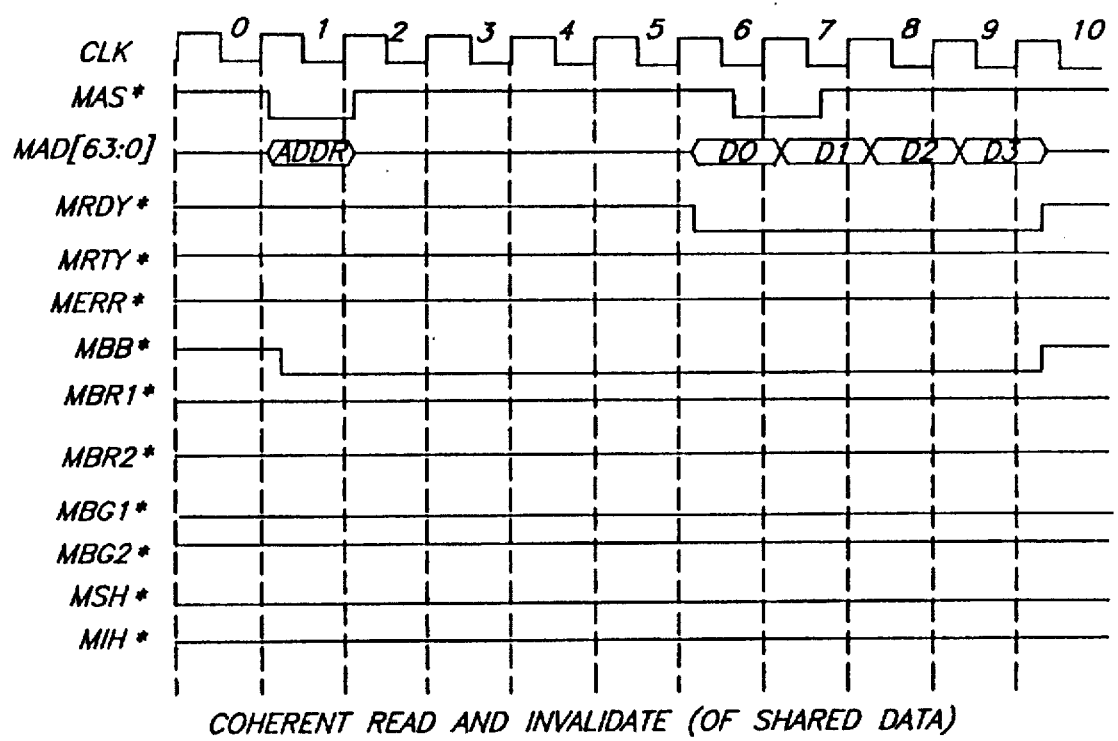
FIGS. 15a and 15b are timing diagrams which respectively illustrate the coherent read and invalidate of shared data and the coherent read and invalidate of owned data operations.
Figure 15B:
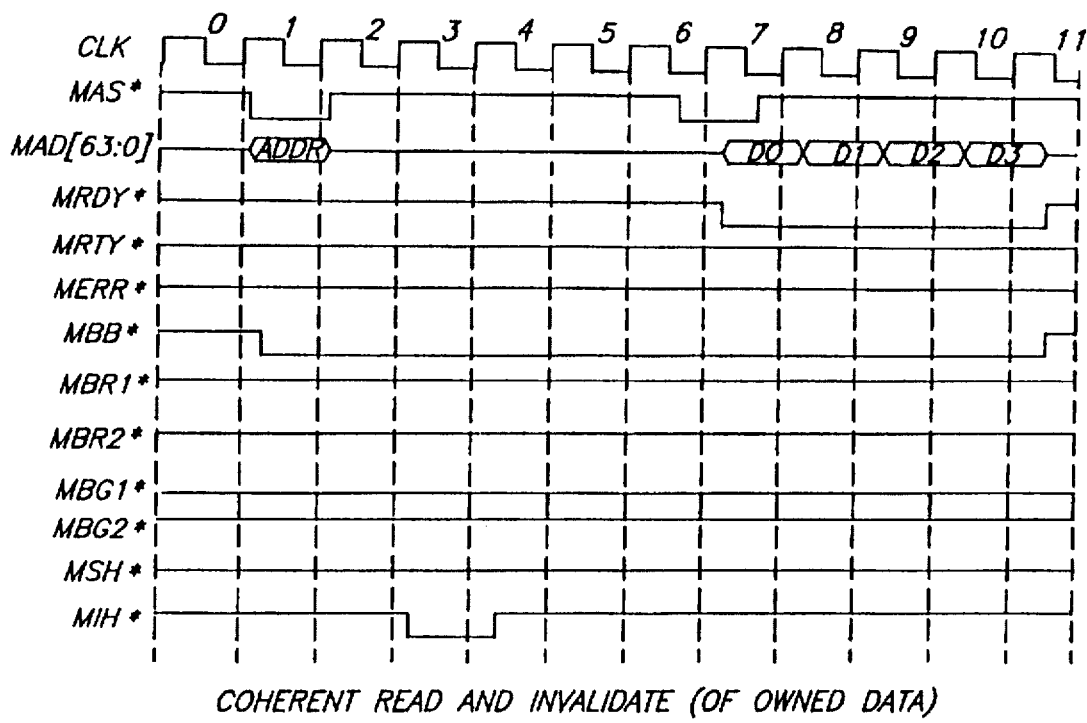

The coherent read and invalidate transaction combines a coherent read transaction with a coherent invalidate transaction in order to reduce the number of coherent invalidate transactions. This transaction is issued by caches that are performing coherent reads with the knowledge that they intend to immediately modify the data. Upon detection of this transaction on the bus, a cache will first provide the data and then invalidate its copy of the block. Timing diagrams for a coherent read and invalidate of shared data and coherent read and invalidate of owned data operations are respectively illustrated in FIGS. 15a and 15b.

Figure 16:
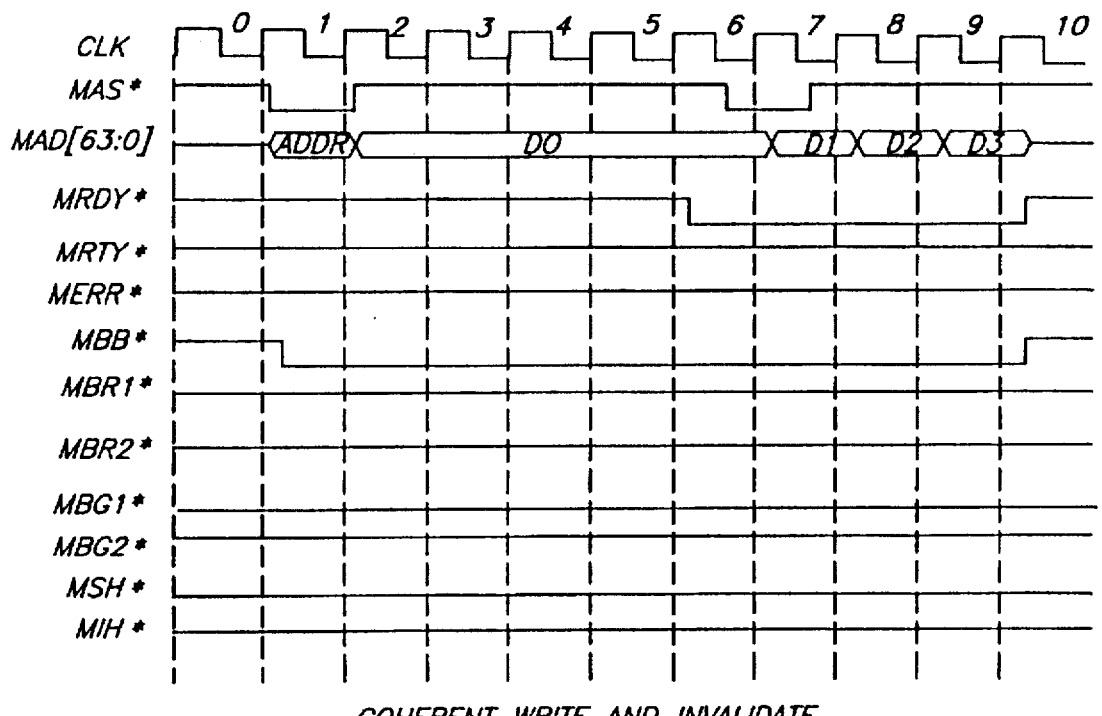
FIG. 16 is a timing diagram which illustrates the coherent write and invalidate operation.

Similarly, the coherent write and invalidate transaction, illustrated by the timing diagram of FIG. 16, contains a write transaction with a coherent invalidate transaction, in order to reduce the number of coherent invalidate transactions required. Upon detection of the transaction, each cache connected to the bus invalidates its copies of the data and the memory is updated in correspondence with the write.

While the invention has been described in conjunction with the preferred embodiment, it is evident that numerous alternatives, modifications, variations and uses will be apparent to those skilled in the art in light of the foregoing description.

We claim:

1. An active high speed bus system comprising:

a first processor module;

a plurality of device modules;

a plurality of bussed signal lines coupled to said first processor module and said plurality of device modules, wherein said plurality of bussed signal lines include:

a first plurality of signal lines for transmitting address information in a first time frame and data in a second time frame;

a second plurality of signal lines for transmitting transaction specific information during said first time frame and data during said second time frame, said transaction specific information including information indicating a type of bus transaction;

a third plurality of signal lines for transmitting information indicating a status of a current bus transaction;

a plurality of bus components centralized as one unit separate and distinct from said first processor module and said plurality of device modules for providing centralized logic functions, said components including:

a component for arbitrating access to said bussed signal lines, said centralized arbiter component coupled to each of said plurality of device modules with one of a plurality of dedicated signal lines;

an interrupt handler component for selectively interrupting the use of said bussed signal lines, said interrupt handler component coupled to each of said plurality of device modules with one of a plurality of dedicated signal lines;

a system reset component for resetting said plurality of device modules, said system reset component coupled to each of said plurality of device modules with one of a plurality of dedicated signal lines;

a system clock component for providing clock signals to said plurality of device modules, said system clock component coupled to each of said plurality of device modules with one of a plurality of dedicated signal lines.

2. The active high speed bus system as provided in claim 1 wherein said transaction specific information includes information identifying a bus master device module to a bus slave device module.

3. The active high speed bus system as provided in claim 1 wherein said plurality of bus components for providing centralized logic functions further comprises an ID logic component for assigning ID's to said plurality of device modules, said ID logic component coupled to each of said plurality of device modules with one of a plurality of dedicated signal lines.

4. The active high speed bus system as provided in claim 1 wherein said information indicating a status of a current bus transaction includes information separately, and distinctly indicating that:

the bus is idle and available for use by said plurality of device modules for a bus transaction;
   a valid data transfer occurred from a bus master device module to a bus slave device module;
   a bus error has occurred;
   a time out has occurred;
   an uncorrectable error has occurred;
   a bus master device module should relinquish the bus and subsequently retry to gain access to the bus; and
   a retry has occurred.

5. The active high speed bus system as provided in claim 1 wherein said information indicating a status of a current bus transaction includes: information distinctly indicating that a first type of error has occurred, and information distinctly indicating that a second type of error has occurred, such that a plurality of error codes are provided and system overhead needed to determine and respond to error signals is decreased.

6. The active high speed bus system as provided in claim 1 wherein said transaction specific information includes: access information asserted by a device module indicating that a current bus transaction requires privileged access, said privileged access being access to the bus that is requested by a system application and not by a user application.

7. The active high speed bus system as provided in claim 1 further comprising cache memory means coupled to the bus, and wherein said transaction specific information includes: cache transaction information asserted by a device module indicating that a current bus transaction is cacheable in said cache memory means.

8. The active high speed bus system as provided in claim 1 further comprising:

a second processor module coupled to said plurality of bussed signal lines, and
   wherein, said plurality of bussed signal lines further includes: a fourth plurality of signal lines for transmitting information pertaining to a multiple processor environment.

9. A method for transferring data from a first module to a second module in a bus transaction in a computer system comprised of a plurality of modules selectively coupled to a bus and a centralized arbiter component and a centralized ID logic component, wherein said bus includes first, second, and third pluralities of bussed signal lines, and each of said modules is selectively coupled to said arbiter component with at least one dedicated signal line, and wherein each one of a plurality of said modules is selectively coupled to said ID logic component with dedicated ID signal line, said method comprising the steps of:

transmitting a bus request signal from said first module to said arbiter component over a first dedicated signal line;
   transmitting a module identifier from said first module to said centralized ID logic component over said dedicated ID signal line for allowing the first module to be uniquely identified as a source of a bus transaction;
   transmitting a bus grant signal from the arbiter component to said first module over a second dedicated signal line;
   coupling from said first module to said second module address information over a first plurality of bussed signal lines during a first time frame;
   coupling from said first module to said second module transaction specific information, including information indicating a type of bus transaction, over a second plurality of bussed signal lines during said first time frame;
   coupling from said first module to said second module data over said first plurality of bussed signal lines and said second plurality of bussed signal lines during a second time frame.

10. The method for transferring data from a first module to a second module in a computer system as provided in claim 9 wherein said transaction specific information coupled from said first module to said second module over said second plurality of bussed signal lines further includes: identification information duplicated from said ID signal line, identifying said first module to said second module.

11. The method for transferring data from a first module to a second module in a computer system as provided in claim 9 wherein said transaction specific information coupled from said first module to said second module over said second plurality of bussed signal lines further includes: access information asserted by said first module, indicating that a bus transaction requires privileged access, said privileged access being access to the bus that is requested by a system application and not by a user application.

12. The method for transferring data from a first module to a second module in a computer system as provided in claim 9 wherein said computer system further comprises a virtually indexed memory cache and said method further includes the steps of:

coupling said address information from said first module to said second module over said first plurality of bussed signal lines; and
   providing virtual address information for virtual addressing of said virtually indexed memory cache.

13. The method for transferring data from a first module to a second module in a computer system as provided in claim 9 wherein said computer system further comprises memory cache means, and said transaction specific information coupled from said first module to said second module over said second plurality of bussed signal lines further includes: cache transaction information indicating that the data transfer is cacheable in said memory cache means.

14. The method for transferring data from a first module to a second module in a computer system as provided in claim 9 wherein said method further includes the step of:

coupling information indicating a status of the data transfer from said second module to said first module over a third plurality of bussed signal lines during said second time frame.

15. The method for transferring data from a first module to a second module in a computer system as provided in claim 9 wherein said method further includes the step of:

in the event of a data transfer error, coupling error information indicating a type of error from said second module to said first module over a third plurality of bussed signal lines during said second time frame.

16. The method for transferring data from a first module to a second module in a computer system as provided in claim 15, wherein said error information includes a plurality of different error statuses.

17. The method for transferring data from a first module to a second module in a computer system as provided in claim 16 wherein said plurality of different error statuses includes a bus error, a time-out, and an uncorrectible system error.

18. The method for transferring data from a first module to a second module in a computer system as provided in claim 9, wherein said transaction specific information coupled from said first module to said second module over said second plurality of bussed signal lines further includes: data size information indicating to said second module the size of the data transfer.

19. The method for transferring data from a first module to a second module in a computer system as provided in claim 9, wherein said transaction specific information coupled from said first module to said second module over said second plurality of bussed signal lines further includes: a bus lock indicator such that said first module is locked to said second module.

* * * * *